(12) United States Patent
Peca et al.

(10) Patent No.: US 9,302,349 B2
(45) Date of Patent: Apr. 5, 2016

(54) EDGE JOINT OF LIGHT WEIGHT COMPOSITES (71) Applicant: PRODUCTIVE RESEARCH LLC, Farmington Hills, MI (US)

(72) Inventors: Stephen John Peca, Fenton, MI (US); Eyal Mizrahi, West Bloomfield, MI (US)

(73) Assignee: PRODUCTIVE RESEARCH LLC, Farmington Hills, MI (US)

(*) Notice: Subject to any disclaimer, the term of this patent is extended or adjusted under 35 U.S.C. 154(b) by 279 days.

(21) Appl. No.: 13/796,327

(22) Filed: Mar. 12, 2013

(65) Prior Publication Data

US 2014/0120364 A1    May 1, 2014

Related U.S. Application Data (60) Provisional application No. 61/720,459, filed on Oct. 31, 2012.

(51) Int. Cl.
*B32B 15/00* (2006.01)
*B23K 26/22* (2006.01)
(Continued)

(52) U.S. Cl.
CPC ............ *B23K 26/22* (2013.01); *B23K 31/02* (2013.01); *B23K 33/00* (2013.01); *B32B 7/04* (2013.01); *B32B 15/085* (2013.01); *B32B 27/20* (2013.01); *B32B 27/22* (2013.01); *B23K 2203/16* (2013.01); *B32B 2250/40* (2013.01); *B32B 2262/103* (2013.01); *B32B 2307/704* (2013.01); *B32B 2307/714* (2013.01); *B32B 2605/00* (2013.01); *Y10T 428/12486* (2015.01)

(58) Field of Classification Search
CPC ............ E04F 2201/01; E04F 2201/023; E04F 2201/03; E04F 2201/04
See application file for complete search history.

(56) References Cited

U.S. PATENT DOCUMENTS 5,992,117 A * 11/1999 Schmidt ............... B62D 33/046
296/186.1
6,582,539 B2    6/2003  Iwanczyk et al.
(Continued)

FOREIGN PATENT DOCUMENTS

JP      2001-526601 A1    12/2001
WO      2010/021899 A1    2/2010
(Continued)

OTHER PUBLICATIONS

PCT International Search Report and Written Opinion, dated Feb. 20, 2014, PCT/US2013/064809, Filed Oct. 14, 2013.
(Continued)

*Primary Examiner* — Adam Krupicka
(74) *Attorney, Agent, or Firm* — The Dobrusin Law Firm, PC (57) ABSTRACT

There are often difficulties in producing materials that are wide and long, such as from the availability of properly dimensioned feedstock materials, processing costs, engineering challenges, and the like. As such, new methods for joining materials are needed. The present invention relates to composite materials, such as a sandwich composite, articles prepared from a composite material, and methods for preparing articles, that employ an edge joint. The edge joint may be employed for attaching the composite material to another composite material, or for attaching it to a monolithic material.

20 Claims, 6 Drawing Sheets

(51) Int. Cl.
    *B23K 31/02* (2006.01)
    *B23K 33/00* (2006.01)
    *B32B 7/04* (2006.01)
    *B32B 15/085* (2006.01)
    *B32B 27/20* (2006.01)
    *B32B 27/22* (2006.01)

(56) References Cited

U.S. PATENT DOCUMENTS

| | | |
|---|---|---|
| 6,627,024 B2 | 9/2003 | Lane |
| 7,927,708 B2 | 4/2011 | Mizrahi |
| 8,048,526 B2 | 11/2011 | Mizrahi |
| 8,153,257 B2 | 4/2012 | Mizrahi et al. |
| 8,540,842 B2 | 9/2013 | Mizrahi |
| 8,609,247 B2 | 12/2013 | Mizrahi |
| 2007/0110989 A1* | 5/2007 | Shin .......................... 428/312.2 |
| 2011/0188927 A1 | 8/2011 | Mizrahi |
| 2011/0200816 A1 | 8/2011 | Mizrahi et al. |
| 2012/0214018 A1 | 8/2012 | Mizrahi et al. |

FOREIGN PATENT DOCUMENTS

| | | |
|---|---|---|
| WO | 2011/100734 A1 | 8/2011 |
| WO | 2012/019115 A1 | 2/2012 |
| WO | 2012/115872 A1 | 8/2012 |

OTHER PUBLICATIONS

Weiss, M. et al., "Elastic Bending of Steel-Polymer-Steel Laminates (SPS) to a Constant Curvature," Journal of Applied Mechanics (ASME), 2006. 73 (4): p. 574-579.

"Sandwich Panel Fabrication Technology" publication, dated May 2001, Hexcel Composites, p. 1-16.

Office Action from the Japanese Patent Office for JP Application No. 2013-555464 dated Jun. 29, 2015.

* cited by examiner

Preferably: ta+t1+t2 = tb+t3+t4
Preferably  tc ≤ ta+t1+t2
Preferably  tc ≤ tb+t3+t4
Preferably  tb≥t1+t2
Preferably  ta≥t3+t4
(Example:   ta=tb and t1+t2=t3+t4)
(Example:   ta=tb and t1=t2=t3=t4)

EDGE JOINT OF LIGHT WEIGHT COMPOSITES

This application claims priority to U.S. Provisional Patent Application 61/720,459 entitled Edge Joint of Light Weight Composites, filed on Oct. 31, 2012, which is incorporated herein by reference in its entirety.

RELATED APPLICATIONS

The technology of the present teachings is related to the teachings of commonly owned and co-pending application U.S. Ser. No. 13/052,292 filed on Mar. 21, 2011, U.S. Ser. No. 12/978,974 filed on Dec. 27, 2010, U.S. Ser. No. 13/027,423 filed on Feb. 15, 2011, U.S. Ser. No. 13/399,459 filed on Feb. 17, 2012, and PCT/2011/46778 filed on Aug. 5, 2011, and U.S. Pat. No. 7,927,708 filed on Aug. 13, 2009, the contents of all of which are hereby incorporated by reference in their entirety.

FIELD OF THE INVENTION

The present invention relates generally to composite materials, and to composite materials that have been attached to other materials where the composite material includes a layer of a polymeric material, and more particularly to wide sheets of composite materials that are formed by edgewise attaching a sandwich composites to another material, such as to another sandwich composite.

BACKGROUND

Light weight composite materials have been used for replacing metal materials, such as for replacing sheets of metal material, with a material that offers a reduction in weight. These light weight composites may include one or more metal layers and one or more polymer layers. Examples of light weight composites include core laminates and sandwich materials.

When manufacturing composite materials, there may be difficulties in manufacturing composite materials that are wide. The difficulties may result from wide materials (e.g., metal sheets, and/or sheets of polymer layers) being unavailable, difficult to produce, or costly. For example, there may be difficulty of producing long (e.g., about 1.1 m or more, about 1.6 m or more, or about 2 m or more) metal sheet (e.g., steel sheets) having both i) a thickness of about 0.3 mm or less (e.g., about 0.2 mm or less) and 2) a width of about 1 m or more (e.g., about 1.5 m or more).

Additionally, in manufacturing articles that include a composite material there is often a need to attach the composite material to one or more other materials. For example, there may be a need to attach a sheet of a composite material to a metal sheet or to another sheet of a composite material. There may be difficulties in attaching such materials, particularly when the attached materials will be subjected to one or more deformation steps (such as one or more stamping steps). For example a region at or near the attachment of the two materials may be thicker than other regions. These "bumps" in thickness may result in difficulties in stamping operations, such as damage to a conventional stamping die.

To overcome these challenges, there is a need for new methods for manufacturing wide composite materials, for new composite materials, and for new articles made from a composite material. For example there is a need for wide composite materials that are wide sheets or other wide blanks of composite materials that can be employed in a forming operation, such as stamping operation.

There is a continuing need for new sheet like materials that are light weight. There is a need for composite materials that are wider. There is a need for new methods for producing composite materials (e.g., for producing composite materials that are wide). There is a need for new methods for edge joining composite materials. There is a need for articles that include edge joined composite materials that can be formed (e.g., stamped) in convention equipment used for forming monolithic metal sheets (e.g., without the need for new stamping machine and/or dies).

SUMMARY OF THE INVENTION

A first aspect of the invention is directed to an article comprising a first sheet, wherein the first sheet is a composite sheet including a polymeric core layer interposed between a first metal layer and a second metal layer, wherein the composite sheet includes one or more peripheral regions without a polymeric core layer between the first and second metal layers; and a second sheet including at least one metal layer; wherein the composite sheet and the second sheet are welded together in a peripheral region of the composite sheet using one or more welds, and the at least one metal layer of the second sheet is interposed between the first and second metal layers of the composite sheet in the region of the weld.

Another aspect of the invention is directed at an article comprising: a first composite material that is a sandwich composite including a first core layer interposed between a first metal layer and a second metal layer, wherein the first composite material has a generally uniform thickness; and a second composite material that is a sandwich composite including a second core layer interposed between a third metal layer and a fourth metal layer, wherein the second composite material has a generally uniform thickness that is about the same as the thickness of the first composite material, and the second composite material is generally coplanar with the first composite material; wherein the article includes a common region that includes a portion of the first metal layer, a portion of the second metal layer, a portion of the third metal layer and a portion of the fourth metal layer; wherein the common region has a total thickness that is equal to or less than the thickness of the first composite material.

Another aspect of the invention is directed at an article comprising: a first composite sheet including a polymeric core layer interposed between a first metal layer and a second metal layer, wherein the first composite sheet includes one or more peripheral regions without a polymeric core layer between the first and second metal layers; and a second composite sheet including a polymeric core layer interposed between a third metal layer and a fourth metal layer, wherein the second composite sheet includes one or more peripheral regions without a polymeric core layer between the third and fourth metal layers; and wherein the first, second, third, and fourth metal layers have a thickness of about 0.08 mm or more; the polymeric core layer of the first composite has a thickness that is equal to or greater than the thickness of the third metal layer; the composite sheet and the second sheet are welded together in a peripheral region of the composite sheet using one or more welds, and the at least one metal layer of the second sheet is interposed between the first and second metal layers of the composite sheet in the region of the weld.

The various aspects of the invention may be further characterized by one or any combination of the following features: the second sheet is a metal sheet that is free of a polymeric core layer; the second sheet is a composite sheet including a polymeric core layer interposed between two metal layers and having one or more peripheral regions without the core layer between the first and second metal layers; the two metal layers of the second sheet are interposed between the two metal layers of the first sheet in the first peripheral region; one of the two metal layers of the second sheet are interposed between the two metal layers of the first sheet, and one of the two metal layers of the first sheet are interposed between the two metal layers of the second sheet; the polymeric core layer includes from metallic fibers having a length of about 30 mm or less, wherein the volume of the metal fibers is from about 3 volume percent to about 23 volume percent, based on the total volume of the polymeric core layer; the polymeric core layer includes about 5 volume percent or less void, based on the total volume of the polymeric core layer; the polymeric core layer includes from about 70 to about 95 volume percent polyethylene, based on the total volume of the polymeric core layer; the article is generally free of polymer in the first peripheral region; the first and second sheet are joined in a joining direction along a length or width of the article; the article includes one or more welds extending at least about 30 percent (e.g., at least about 50 percent) of the distance (e.g., length or width) of the article in the joining direction; the article includes a plurality of spaced apart welds; the first, second, third, and fourth metal layers have a thickness of about 0.10 mm or more; the first polymeric core layer has a thickness equal to or greater than the combined thickness of the third and fourth metal layer; in the region of a weld, the third and fourth metal layers are interposed between the first and second metal layers; at least one edge of the first composite sheet is a first peripheral region without any polymeric core layer, and the first peripheral region extends inwards about 5 mm or more from the edge; the first composite sheet has a thickness, a length, and a width; the first composite sheet includes a first peripheral region and a second peripheral region on opposing edges of the sheet; the first and second peripheral regions lengthwise extend the length of the sheet, widthwise extend inwards about 10 mm or more from the edge, and extend the distance between the first and second metal sheets in the thickness direction of the sheet; the polymeric core layer includes from about 75 to about 95 volume percent polyethylene, from about 5 to 25 volume percent metal fibers, and from about 0 to 5 volume percent voids; the metal fibers have a length from about 3 to 30 mm; the metal fibers have a length of about 5 to 20 mm; the metal fibers have a cross-section perpendicular to the length of the fibers, wherein the cross-section is generally rectangular; the metal fibers include steel fibers; the metal fibers include aluminum fibers; the metal fibers include a layer of zinc; the first composite material includes a core layer that includes a sufficient amount of metal fibers so that a weld current can pass through the core for welding to a metal substrate, and the second composite material includes a core layer that is generally free of metal fibers; or the first composite material and the second composite material are generally free of metal fibers.

A process related aspect of the invention is direct to a process comprising the steps of: providing a first composite sheet including a polymeric core layer interposed between a first metal layer and a second metal layer, wherein the first composite sheet includes one or more peripheral regions without a polymeric core layer between the first and second metal layers; providing a second sheet comprising at least a third metal layer, wherein the third metal layer has an edge, and the thickness of the third metal layer is sufficiently low that so that the edge of the third metal layer can fit into one of the peripheral regions of the composite sheet; positioning the edge of the third metal layer between the first metal layer and the second metal layer of the composite sheet so that a stack of the first metal layer, the second metal layer, and the third metal layer is formed having a width of about 5 mm or more; and welding the stack of the first metal layer, the second metal, layer, and the third metal layer.

This aspect of the invention may be further characterized by one or any combination of the following features: the second sheet is a composite sheet including a third metal layer and a second metal layer; the stack in one of the peripheral regions includes the first, second, third, and fourth metal layers; the welding includes welding the first, second, third, and fourth metal layers; the stack of metal layers includes both the third and fourth metal layers interposed between the first and second metal layers; or the stack of metal layers includes the second metal layer interposed between the third and fourth metal layers.

Another process related aspect of the invention is directed to a process of manufacturing an article, such as an article described herein, wherein the process comprises a step welding the composite sheet to the second sheet. This aspect of the invention may be further characterized by: the process includes a step of stamping, bending, or otherwise forming an article including the first sheet and the second sheet, wherein the first sheet and the second sheet are both plastically deformed.

DETAILED DESCRIPTION

The various aspect of the invention are directed at light weight materials, manufacturing of the materials, and joining the materials. For example, the light weight material may be used for manufacturing an article that includes two or more components. At least one component of the article is a composite material, such as a composite that includes one or more metal layer and one or more polymeric layers. Preferably the first component is a composite material including two metal layers and a polymeric layer interposed between the two metal layers. For example, the first component may be a sandwich composite where the polymeric layer is sandwiched between two metal layers. The first component may be in the form of a sheet, such as a sheet having a generally low thickness (e.g., about 20 mm or less, about 7 mm or less, or about 4 mm or less). The first component may be relatively long, relatively wide, or both. For example the ratio of the length to the thickness may be about 5 or more, about 10 or more, or about 100 or more, or about 500 or more. The ratio of the width to the thickness may be about 5 or more, about 10 or more, or about 100 or more, or about 500 or more.

The second component of the article may be formed of any material that can be attached to the first component. Preferably, the second component is a material that includes a metal layer. The second component of the article may be a monolithic metallic material. The second component may include layers of different materials. For example, the second component may be a composite material, such as a composite material described herein for the first component. It will be appreciated, according to the teachings herein, that the second component and the first component may be the same or different.

The first and second components are preferably attached at or near one of the edges (i.e, an edge periphery) of the first component and at or near one of the edges of the second component. By attaching the components along an edge, it may be possible to increase the length of article (e.g., compared with the first and second components individually), to increase the width of the article, or both. The region of the article where the two components are attached may be called the "common region." In the common region, the thickness of the article will include at least a portion of the first component and at least a portion of the second component. As discussed herein, the common region preferably includes or consists essentially of portions of the one or more metal layers.

The first component and optionally the second component include a polymeric layer. For example, the polymeric layer may be a core layer of a sandwich composite. The polymeric layer generally has a lower density than the metal layer and provides for efficient weight reduction of the material. It will be appreciated that a generally thick polymeric layer may result in sufficient weight reduction to justify any inherent difficulties and expenses of producing parts with composite materials. Such weight reductions may be particularly advantageous in transportation related applications and for products that will need to be transported. The total volume of the polymeric layers in the article is preferably about 15 volume percent or more, more preferably about 20 volume percent or more even more preferably about 25 volume percent or more, and most preferably about 30 volume percent or more, based on the total volume of the article.

The first component (e.g., a first sheet of the composite material) generally includes a first region and a second region that have different thicknesses. The regions having different thicknesses may be at different positions along the width of the first component, at different positions along the length of the first component, or both. Preferably, the first region has a higher thickness and has a core layer that is thicker compared with the thickness of the core layer in the second region. The second region preferably is a region that is free of the core layer, i.e., "a core free region," and the first region is a "core containing region." The first region and the second region may include the same or different metal layers. Preferably the first region and the second region of the first component include that same metal layers (e.g., the same metals having the same thickness). The second region (e.g., the core free region) preferably is near an edge periphery region of the first component. For example, a second region may extend along a lengthwise edge of the first component. The second region may extend along a widthwise edge of the first component. The first component may include a plurality of second regions. For example, the first component may include a generally core free region at or near one or more edges, at or near two or more edges (e.g., two opposing edges, or two adjacent edges), or at or near three or more edges of the first component. It will be appreciated that the first component may include generally core free regions at or near all of its edges. Preferably, the first component includes a generally core free region at or near a single edge, or at or near two opposing edges (e.g., to parallel edges).

The ratio of the thickness of the core layer in the second region to the thickness of the core layer in the first region of the first component may be less than 1.0, about 0.8 or less, about 0.6 or less, about 0.4 or less, about 0.2 or less, about 0.1 or less, or about 0.

The second region may be characterized as having a width. The width of the second region may be measured from the edge of the first component (e.g., a sheet of a composite material) to the start of the first region. The width of the second region may be employed for attaching the first component to the second component. The second region should have a sufficient width so that a durable attachment to the second component can be achieved. For example, the width of the second region may be about 1 mm or more, preferably about 3 mm or more, more preferably about 5 mm or more, and more preferably about 7 mm or more (e.g., about 10 mm or more). The width of the second region should be sufficiently low so that the article achieves a desired weight reduction by employing a large amount of the core layer. The width of the second region preferably is about 150 mm or less, more preferably about 100 mm or less, even more preferably about 75 mm or less, and most preferably about 50 mm or less. It will be appreciated that the width of the second region (e.g., a core free region) may be greater than 150 mm.

The ratio of the width of the first region to the width of the second region preferably is high so that generally large weight reduction in the article is achieved by through the use of the core material. The ratio of the width of the first region to the width of the second region preferably is about 0.3 or more, more preferably about 1 or more, even more preferably about 4 or more, even more preferably about 10 or more, even more preferably about 25 or more, and most preferably about 50 or more.

In the second region of the first component, the metal layers may be spaced apart so that a gap is created for receiving portions (e.g., edge portions) of one or more metal layers of the second component. Alternatively, going from the first region to the second region, one or both of the metal layers may be bent inwards so that the spacing between the metal layers is reduced or eliminated. For example, a second region having metal layers that are closely spaced may be more easily inserted into a gap (e.g., between two metal layers in a second region), or may be more easily stacked with one or more metal layers of a second component. When the metal layers are used for receiving one or more metal layers of the second component, the second region (e.g., the core free region) may include one or more receiving features for facilitating the receiving of and/or the positioning of the metal layers of the second material into the gap of the second region. For example, one or both of the metal layers of the first component may be bent away from each other in the second region so that the spacing between the two metal layers is greater in the second region compared with the spacing between the two metal layers in the first region. It will be appreciated that after receiving one or more metal layers, a receiving feature may be closed or reduced. For example, a first component may have a gap where the metal layers are separated by an initial distance for receiving one or metal layers, and after receiving the one or more metal layers the two components are attached in a common region, and after attaching the two components, the separation between the metal layers in the common region is a final distance, where the final distance is less than the initial distance. By way of example, the two layers of the first component may be forced closer together during a process of welding together the stack of metal layers in the common region.

As discussed hereinbefore, the second component may be the same or different from the first component. For example, the second component may be a sheet of a composite material having one or any combination of the features described herein for the first component. Alternatively, the second component may consist essentially of one or more metal layers. For example, the second component may be characterized as being free of a polymeric core layer.

If the second component is a sheet of a composite material, the second component preferably includes a first region (i.e., a core containing region) that includes a polymeric core, and a second region (i.e., a core free region), that is generally free of a polymeric core material. As discussed hereinbefore with respect to the first component, the second component preferably includes one or more core free regions along one or more edges of the second component. The second component may have a core free region having a width that is greater than, about equal to, or less than a width of the core free region of the first component. Preferably, in the common region, the first and second components include core free regions that have about the same width (e.g., the widths may be within +/−75%, within +/−50%, within +/−25%, within +/−10% or within +/−5%).

When the first and second components are attached, generally one or more metal layers of the first component will be in contact with one or more layers of the second component. Similarly at least one surface of a metal layer of the first component will be in contact with at least one surface of a metal layer of the second component. Such surface contact between surfaces of the two components is an intercomponent surface contact. The number of intercomponent surface contacts may be 1 or more and preferably is 2 or more.

Case 1

A single metal layer inserted into the gap of the first component. Here, there are two intercomponent surface contacts. In particular, the each surface of the inserted metal layer contacts a different metal layers of the first component.

Case 2

Two composite materials that are interdigitized. Here, there are three intercomponent surface contacts. The first component has metal layers 1 and 2, and the second component has metal layer 3 and 4. In the article, metal layer 3 is inserted between metal layers 1 and 2, and metal layer 2 is inserted between metal layers 3 and 4. The intercomponent interfaces are 1/3, 2/3, and 2/4. In this case, there are no intracomponent interfaces (i.e., no contact between metal layers of the same component).

Case 3

Two composite materials where both metal layers of the second component are inserted into the gap of the first component. Here, metal layers 3 and 4 are both inserted between metal layers 1 and 2. Here, the number of intercomponent surface contacts is 2 (i.e., 1/3 and 2/4). There is also intracomponent surface contact between metal layers 3 and 4.

Case 4

Two composite material where the metal layers of the second component are either both above or both below the two metal layers of the first component. Here, there is one intercomponent surface contact and two intracomponent surface contacts. For example, there may be an intercomponent surface contact between metal layers 2 and 3, and the intracomponent surface contacts will be 1/2 and 3/4.

A metal layer may be inserted partially or entirely into a core free region of a sheet of a composite material. When the metal layer is partially inserted into the core free region, a gap remains between the inserted metal layer and the core material of the core containing region. When the metal layer is fully inserted into a core free region, the edge of the metal layer contacts (e.g., abuts) the core material in the core containing region.

SECURING/ATTACHING TWO COMPONENTS. The two components may be attached in a common region by one or more attachment means so that the two components do not separate during use. Any attachment means suitable for attaching metal layers may be employed. For example, the attachment means may including heating faces and/or fusing surfaces of the metal layers; mechanically attaching two or more (e.g., all of) the metal layers; or chemically attaching two or more metal layers. Preferably all of the metal layers are attached to the metal layers to which they contact (e.g., in the common region of the two components).

Attachment means that employ heat and/or fusion will generally heat some of the material at an interface between two metal layer so that the metal layers fuse together directly or fuse to one or more additional layers that have been positioned between the two metal layers. For example, the attaching of the two components may include brazing and/or welding of metal layers. Metal layers may joined by conventional welding techniques such as resistance welding (e.g., spot welding, seam welding, flash welding, projection welding, or upset welding), energy beam welding (e.g., laser beam, electron beam, or laser hybrid welding), gas welding (e.g., oxyfuel welding, using a gas such as oxyacetylene), arc welding (e.g., gas metal arc welding, metal inert gas welding, or shielded metal arc welding). Preferred joining techniques include high speed welding techniques such as resistance spot welding and laser welding. Metal layers may be attached using one or more mechanical fastening means. Any conventional mechanical fastening means may be employed. The mechanical fastening may employ one or more fastening features on one or both components, the mechanical fastening may employ one or more additional components having a fastening feature, or both. Examples of conventional mechanical fastening includes riveting, bolting, screwing, forming a mechanical interlock, and the like. Metal layers may be chemically attached using one or more chemical attachment means. Any conventional chemical attachment means may be employed. The chemical attachment may be achieved by bonding the metal layers using one or more chemicals. The chemical attachment may employ one or more primers, one or more adhesives, or both. For example, the adhesive may be a one part adhesive or a two part adhesive.

The sheet including the two attached components (or a blank made from such a sheet) may be subjected to a suitable forming process, such as a process that plastically deforms the sheet and may include a step of stamping, roll forming, bending, forging, punching, stretching, coiling, some other metalworking, or any combination thereof. A preferred forming process is a process that includes a step of stamping the composite material. The stamping process may occur at or near ambient temperatures. For example, the temperature of the composite material during stamping may be less than about 65° C., preferably less than about 45° C., and more preferably less than about 38° C. The forming process may involve drawing regions of the composite material to various draw ratios. In one aspect of the invention, the composite material is subjected to a step of drawing to a relatively high draw ratio without breaking, wrinkling, or buckling. For example, it is subjected to a step of drawing so that at least a portion of the composite is drawn to a draw ratio greater than 1.2. Desirably, the composite material may be capable of being drawn and is drawn to a maximum draw ratio greater than about 1.5, preferably greater than about 1.7, more preferably greater than about 2.1, and most preferably greater than about 2.5. The cracking limit of the draw ratio may be determined using the circular cup drawing test as described by Weiss et al. (M. Weiss, M. E. Dingle, B. F. Rolfe, and P. D. Hodgson, "The Influence of Temperature on the Forming Behavior of Metal/Polymer Laminates in Sheet Metal Forming", Journal of Engineering Materials and Technology, October 2007, Volume 129, Issue 4, pp. 534-535), incorporated herein by reference. The forming process may include a step applying a pressure to a die (e.g., a die having a hardness, as measured according to Mohs hardness scale, greater than the hardness of the metallic fibers) in contact with the composite material.

Suitable forming processes that may be employed include those described in International Patent Application Publication No. WO2010/021899 published on Feb. 25, 2010 by Mizrahi.

After attaching the two components, to form a multi-component sheet, it may be desirable that the sheet be substantially free of, or entirely free of "bumps" in the thickness that may damage the forming equipment. A bump in the thickness may be a region having a relatively high thickness greater than the initial thickness of the first component prior to attachment, greater than the thickness of the second component prior to attachment, or both. For example, the multi-component sheet may be described as having a generally uniform thickness. In particular, the common region preferably has a thickness that is about equal to or less than the thickness of the first component, the second component, or both. Such sheets may be employed in conventional stamping equipment (e.g., using conventional dies) without modifying the equipment to accommodate thickness variations in the sheet.

The multi-component sheet is preferably formable by low-cost stamping methods. For example, the multi-component sheet may be employed in low-cost stamping methods for parts having a width and length that are each independently about 1 m or more (e.g., about 1.2 m or more, about 1.4 m or more, about 1.5 m or more, about 1.6 m or more, about 2 m or more, or about 2.1 m or more) and yet is surprisingly free of the limitations that have been faced previously in the art. The unique features of the composite material render it an extremely attractive candidate for applications which traditionally utilize a regular monolithic metal sheet, such as in the body panels currently employed in the transportation (e.g., automotive) industry.

The core layer includes, consists essentially of, or consists entirely of one or more materials that are lower in density than the metal layers, so that the density of the composite material is reduced compared with a monolithic material made of the metal of the metal layer. By increasing the thickness of the core layer and by increasing the amount of polymer in the core material, the density of the composite material may be reduced or minimized. The core layer includes, consists essentially of, or consists entirely of one or more polymers. The core layer preferably extends between two metal layers of the composite material. In the regions of the composite material that includes the core layer, the core layer preferably fills the space between the two metal layers. As such, the composite material may be characterized as being fee of void space in the core layer containing regions. Preferably, the core layer fills the entire space between two metal layers, except for the generally core free regions along one or more edges of the composite material. As such, the core layer may contribute to the integrity of the structure of the composite material.

The core layer preferably has a density (as measured according to ASTM D792-00 at room temperature) of about 2.8 or less, more preferably about 2.1 or less, even more preferably about 1.8 or less, even more preferably about 1.5 or less, and most preferably about 1.3 or less. The core layer may even have a density of about 1.0 or less. Typically the core layer has a density of about 0.8 or more.

The core layer may be free of fillers or may include one or more fillers. For example, the core layer may include, consist essentially of, or consist entirely of one or more filled polymeric materials having one or more fillers dispersed in one or more polymers. The filled polymeric material may include one or any combinations of the features of the polymeric layer described in International Patent Application Publication No. WO 2012/019115A1, published on Feb. 9, 2012, incorporated herein by reference (see for example, paragraphs 48 through 54, and paragraphs 55 through 115).

Core layers that include filler preferably include generally light weight fillers (e.g., fillers having a density of about 2 or less) and/or low concentration of fillers. For example, the core layer may be generally free of, or entirely free of metallic filler. If metallic fillers are employed, they preferably are employed at a concentration of about 50 volume percent or less, more preferably about 30 volume percent or less, and most preferably about 23 volume percent or less, based on the total volume of the filled polymeric material. The concentration of the one or more polymers in the filled polymeric material preferably is about 50 volume percent or more, more preferably about 70 volume percent or more, and most preferably about 77 volume percent or more based on the total volume of the filled polymeric material. The concentration of the one or more polymers may be 100% or less, about 97 volume percent or less, about 95 volume percent or less, or about 90 volume percent or less, based on the total volume of the core layer (e.g., the filled polymeric material).

It will be appreciated that metallic filler, such as metallic fibers, may be employed in the core layer so that the composite material may be welded in the core containing regions, so that the mechanical properties of the core containing region are improved, or both.

Preferably the core layer has a generally uniform thickness so that it can be used in a sheet having a generally uniform thickness. For example, the variation in the thickness of the core layer (i.e., excluding core free regions of the composite) may be about ±40% or less, ±30% or less, ±20% or less, ±10% or less, ±5% or less, or ±2% or less.

The core layer includes or consists essentially of one or more polymers. Preferably, at least some of the polymer in the core layer is a thermoplastic, but it may be or include a thermoset polymer, particularly a thermoset polymer that is processable as a thermosplastic, but cured. Preferably, at least 50% (more preferably at least 60%, 70%, 80%, 90% or even 95%, if not 100%) by weight of the polymer used in the core layer (e.g., in the filled polymeric material is a thermoplastic polymer).

The thermoplastic polymer employed in the core layer may include, consist essentially of, or consist of one or any combination of the thermoplastic polymers described in International Patent Application Publication No. WO 2012/019115A1, published on Feb. 9, 2012, incorporated herein by reference (see for example, paragraphs 55 through 86).

The polymer may have one or any combination of the properties described for the polymers in International Patent Application Publication No. WO 2010/021899 A1, published on Feb. 25, 2010 incorporated herein by reference (see for example, paragraphs 52.63).

With more attention now to particular examples of polymers for use herein, the polymers used for the core layer preferably include thermoplastic polymers that either have a peak melting temperature (as measured according to ASTM D3418-08) or a glass transition temperature (as measured according to ASTM D3418-08) greater than about 50° C. (preferably greater than about 80° C., even more preferably greater than about 100° C., even more preferably greater than about 120° C., more preferably greater than about 160° C., even more preferably greater than about 180° C., and most preferably greater than about 205° C.). The thermoplastic polymer may have a peak melting temperature, a glass transition temperature, or both that is less than about 300° C., less than about 250° C., less than about 150° C., or even less than about 100° C. They may be at least partially crystalline at room temperature or substantially entirely glassy at room temperature.

Examples of thermoplastic polymers which may be used for the core layer include polyolefins (e.g. polyethylene (such as linear low density polyethylene) and polypropylene), acetal copolymers, polyamides, polyamide copolymers, polyimides, polyesters (e.g., polyethylene terephthalates and polybutylene terephthalate), polycarbonates, thermoplastic polyurethanes, thermoplastic polyether-ester copolymers (such as a thermoplastic elastomer ether-ester material described in ASTM D 6835-08, incorporated herein by reference), acrylonitrile butadiene styrene copolymers, polystyrenes, copolymers including at least 60 wt. % of an α-olefin and at least one additional monomer (such as an ethylene copolymers including at least 80 wt. % ethylene), copolymers including any of these polymers, ionomers including any of these polymers, blends of any of these polymers, or any combination thereof. As can be appreciated from the above description, one or more polymers may be an elastomer, such as a thermoplastic elastomer. The core layer may include one or more polymers having sufficient adhesion to metal so that the polymer adheres to the metallic fibers, a metal layer, or both.

Preferable polyolefins for use in the core layer include polypropylene homopolymers (e.g., isotactic polypropylene homopolymer), polypropylene copolymers (e.g., random polypropylene copolymers, impact polypropylene copolymer, or other polypropylene copolymer containing isotactic polypropylene), polyethylene homopolymer, polyethylene copolymers (e.g., preferably including at least about 60% ethylene, more preferably at least 80 wt. % ethylene), a blend of any of these polymers, or any combination thereof. Polypropylene homopolymers and polypropylene copolymers may be substantially free of atactic polypropylene. If present, the concentration of atactic polypropylene in the polypropylene preferably is less than about 10 wt %. Suitable polypropylene copolymers and polyethylene copolymers include copolymers that consist essentially of (e.g., at least 98% by weight), or consist entirely of one or more α-olefins. Other polypropylene copolymers and polyethylene copolymers that may be used include copolymers containing one or more comonomers selected from the group consisting acrylates, vinyl acetate, acrylic acids, or any combination thereof. The concentration of the comonomer may be less than about 40 wt. %, preferably less than about 25 wt. %, more preferably less than about 20 wt. %, and most preferably less than about 15 wt. % based on the total weight of the copolymer. Exemplary polyethylene copolymers that may be used include ethylene-co-vinyl acetate (i.e., "EVA", for example containing less than about 20 wt. % vinyl acetate), ethylene-co-methyl acrylate (i.e., EMA), ethylene co-methacrylic acid, or any combination thereof.

Exemplary polyolefins that may be employed in any of the embodiments herein include homopolymers and copolymers including about 50 wt. % or more of an α-olefin having about 2 to about 10 carbons. Preferred polyolefins include those having about 50 wt. % or more of ethylene, propylene, butane, or hexane. More preferred polyolefins include those having about 50 wt. % or more of ethylene, or propylene. The concentration of the α-olefin (e.g., the concentration of the ethylene or propylene) in the polyolefin preferably is about 60 wt. % or more, more preferably about 70 wt. % or more, even more preferably about 80 wt. % or more, and most preferably about 90 wt. % or more, based on the total weight of the polyolefin. Preferred polyolefins include polyolefins consisting essentially of one or more α-olefins. For example, the concentration of the one or more α-olefins may be about 90 wt. % or more, about 95 wt. % or more, about 98 wt. % or more, about 99 wt. % or more, or about 99.9 wt. % or more, based on the total weight of the polyolefin. Without limitation, the polyolefin used in a blend with an ionomer may include or consist essentially of high density polyethylene (e.g., having a density of about 0.945 to about 0.990 g/cm$^3$), low density polyethylene, linear low density polyethylene (e.g., a copolymer having a density of about 0.915 to about 0.930 g/cm$^3$), medium density polyethylene (e.g., a copolymer having a density of about 0.930 to about 0.945 g/cm$^3$), very low density polyethylene (e.g., having a density of about 0.900 to about 0.915 g/cm$^3$), polyethylene plastomers (e.g., a copolymer having a density of about 0.860 to about 0.900 g/cm$^3$, preferably from about 0.870 to about 0.895 g/cm$^3$), isotactic polypropylene homopolymer, isotactic polypropylene copolymers having a crystallinity of about 5 wt. % or more, impact polypropylene, polypropylene block copolymers including one or more blocks of isotactic polypropylene, mixtures thereof, or any combination thereof.

Examples of other polyolefins suitable for use in the core layer are copolymers including or consisting essentially of i) about 60 wt. % or more of an α-olefin; and ii) one or more monomers selected from the group consisting of vinyl acetate, methyl acrylate, butyl acrylate, acrylic acid, methyl methacrylate, methacrylic acid, and any combination thereof. The polyolefin may include a sufficient amount of the ionomer so that the polymer adheres to the metal layers, to the metallic fiber, or both.

The thermoplastic polymers are preferably relatively long chain polymers, such that they may have a number average molecular weight greater than about 20,000, preferably greater than about 60,000, and most preferably greater than about 140,000. They may be unplasticized, plasticized, elastomer modified, or free of elastomer. Semi-crystalline polymers may have a degree of crystallinity greater than about 10 wt %, more preferably greater than about 20 wt %, more preferably greater than about 35 wt %, more preferably greater than about 45 wt %, and most preferably greater than about 55 wt %. Semi-crystalline polymers may have a degree of crystallinity less than about 90 wt %, preferably less than about 85 wt %, more preferably less than about 80 wt %, and most preferably less than about 68 wt %. Crystallinity of the thermoplastic polymer may be measured using differential scanning calorimetry by measuring the heat of fusion and comparing it to art known heat of fusion for the specific polymer.

The polymer of the core layer may also contain up to about 10 wt % of a grafted polymer (e.g., a grafted polyolefin such as isotactic polypropylene homopolymer or copolymer, or a polyethylene homopolymer or copolymer) which is grafted with a polar molecule, such as maleic anhydride. The concentration of the grafted compound may be about 0.01 wt. % or more based on the total weight of the grafted polymer. Particularly preferred grafted polymers include from about 0.1 wt. % to about 3 wt. % maleic anhydride.

The core layer may be substantially or entirely free of filler or may include a filled polymeric material that includes one or more fillers. If filler is employed in the core layer the filler may have any shape and size. The filler may be formed of any material. For example, the filler may be a metallic filler, a polymeric filler, a mineral filler and the like. Examples of fillers that may be employed include metallic fillers, carbon nano-tubes, carbon black, silica, talc, mica, calcium carbonate, magnesium carbonate, clay, calcium silicate, hydrotalcite, diatomaceous earth, graphite, pumice, ebonite powder, cotton flock, cork powder, barium sulfate, wollastonite, zeolite, sericite, kaolin, pyrophyllite, bentonite, alumina silicate, alumina, silicon oxide, magnesium oxide, zirconium oxide, titanium oxide, iron oxide, iron phosphide, dolomite, calcium sulfate, barium sulfate, magnesium hydroxide, calcium hydroxide and aluminum hydroxide, boron nitride, silicon carbide, glass, and any combination thereof. One or more filler may include a nano tube structures, a layered structures, an intercalated structure, or some other structure. Preferred fillers include or consist essentially of metallic fibers. Exemplary metallic fillers which may be used in the invention include fillers formed from metals such as steel (e.g., low carbon steel, stainless steel, and the like), aluminum, magnesium, titanium, copper, alloys containing at least 40 wt % copper, other alloys containing at least 40 wt % iron, other alloys containing at least 40 wt % aluminum, other alloys containing at least 40 wt % titanium, and any combination thereof. Any of the metals which may be used for the metallic layer(s), as described later, may also be used for the metallic fibers. Some or all of the metal filler may be of a metal or a metal alloy that is generally corrosion resistant (e.g. stainless steel), or some or all of the metal fiber may be of a metal or metal alloy (e.g., aluminum, magnesium, or both) that offers cathodic protection to the metal layers and/or to other metal fillers.

The filler (e.g., metallic filler) preferably includes, consists essentially of, or consists entirely of fibers. The concentration of the fibers (e.g., metallic fibers) is preferably greater than about 1 volume %, more preferably greater than about 3 volume %, even more preferably greater than about 5 volume %, even more preferably greater than about 7 volume %, even more preferably greater than about 10 volume %, and most preferably greater than about 12 volume % based on the total volume of the filled polymeric material. The metallic fibers may be present in the filled polymeric material at a concentration less than about 50 volume %, preferably less than about 40%, more preferably less than about 35 volume %, still more preferably less than about 33 volume %, and most preferably less than about 30 volume % (e.g. less than about 25 volume %, or even less than about 23, 20, or 15 volume %). For example the amount of fiber may be about 1%, 2%, 3%, 4%, 5%, 6%, 7%, 8%, 9%, or 10%, by volume based on the total volume of the filled polymeric material, or within a range bounded by those values (such as from about 1% to about 6%).

The thermoplastic polymer material may be present in the filled polymeric material at a concentration greater than about 40 volume %, preferably greater than about 65 volume %, more preferably greater than about 67 volume %, still more preferably greater than about 70 volume %, and most preferably greater than about 75 volume % (e.g., at least about 80 volume %, at least about 90 volume %, or even at least about 95 volume %).

The volume ratio of the polymer (e.g., the thermoplastic polymer) to the fibers (e.g., the metallic fibers) is preferably greater than about 2.2:1, more preferably greater than about 2.5:1, and most preferably greater than about 3:1. The volume ratio of the polymer (e.g., the thermoplastic polymer) to the fibers (e.g., the metallic fibers) is preferably less than about 99:1, more preferably less than about 33:1, even more preferably less than about 19:1, and most preferably less than about 9:1, (e.g., less than about 7:1).

The filler employed in the core layer may include, consist essentially of, or consist of one or any combination of the fillers described in International Patent Application Publication No. WO 2012/019115A1, published on Feb. 9, 2012, incorporated herein by reference (see for example, paragraphs 87 through 115). Metallic fillers (e.g. metallic fibers) that may be employed are also described in International Patent Application Publication WO 2010/021899 (published on Feb. 25, 2010 by Mizrahi), see for example paragraphs 064-081, incorporated herein by reference and U.S. patent application Ser. No. 12/978,974 (filed on Dec. 27, 2010 by Mizrahi), see for example paragraphs 52-70, FIGS. 2A, 2B, 2C, 2D, 2E, 2F, 2G, 2H, 2I, 2J, 3, and 4, both incorporated herein by reference.

Preferred metallic fibers have an average length of about 1 mm or more, more preferably about 2 mm or more, even more preferably about 3 mm or more, even more preferably about 4 mm or more, and most preferably about 5 mm or more. The metallic fibers preferably have a length of about 50 mm or less, more preferably about 40 mm or less, even more preferably about 30 mm or less, even more preferably about 25 mm or less, and most preferably about 20 mm or less.

The product of the concentration of the filler (in volume percent based on the total volume of the filled polymeric composition) and the density of the filler preferably is small so that the core layer is generally light weight. The product of the concentration of filler and the density of the filler preferably is about 2 or less, more preferably about 1.5 or less, even more preferably about 1.3 or less, even more preferably about 1.1 or less, and most preferably about 1.0 or less.

Preferred metal fibers are characterized as having a cross-section (e.g., perpendicular to the length of the fiber) that includes one or more sides that are generally flat. For example, the cross-section may have a generally rectangular shape. As such the fibers may be ribbon fibers.

The metal layers employed in the composite material may include, consist essentially of, or consist of one or any combination of the metal layers described in International Patent Application Publication No. WO 2012/019115A1, published on Feb. 9, 2012, incorporated herein by reference (see for example, paragraphs 122 through 127).

Other examples of metal layers that may be employed are described in described in International Patent Application Publication No. WO2010/021899 (see for example, paragraphs 82 through 84) published on Feb. 25, 2010, by Mizrahi, incorporated herein by reference.

The metal layer may include one or more metals. The metal layer may be formed of a metal or metal alloy. Preferred metal layers include or consist essentially of steel, aluminum, or both. If the composite material is used in a welding operation, it is preferable that the metal layer is selected so that the metal layer may be welded to another layer. For example, the metal layer may The metal layer may include, consist essentially of, or consist entirely of a steel. The steel may be any steel. For example, the steel may including iron and one or more elements selected from the group consisting of boron, carbon, chromium manganese, vanadium, tungsten, molybdenum, silicon, nickel. The steel may have an SAE designation 1xxx, 2xxx, 3xxx, 4xxx, 5xxx, 6xxx, 7xxx, 8xxx, or 9xxx. The steel may be a plain carbon steel, a resulfurized steel, a resulfurized and rephosphorized steel, a manganese steel, a nickel steel, a nickel-chromium steel, a molybdenum steel, a chromium-molybdenum steel, a nickel-chromium-molybdenum steel (which may optionally include vanadium), a nickel-molybdenum steel, a chromium steel, a chromium-vanadium steel, a tungsten-chromium steel, a silicon-manganese steel, a high-strength low alloy steel, a leaded steel. The steel may include grains including ferrite, austenite, cementite, martensite, or any combination thereof. The steel may be a corrosion-resistant steel, such as a stainless steel.

The articles according to the teachings herein include two components (e.g., two sheets of composite material) that are attached. The two components may be attached during the production of the first composite material, or may be attached after the first composite material is produced.

The process for preparing an article may include a step of provide as separate components, a first component that is a sheet of a composite material and second component that includes one or more metal layers. The first component preferably is a sheet having a core layer interposed between two metal layers and includes one or more edge regions that is generally free of the core layer. The process may include a step of inserting one or more metal layers of the second component into an edge region of the first component. The process may include one or more steps of attaching the metal layers of the two components together in the region that includes portions of the two components (i.e., the common region). The attachment may include a step of fusing two or more metal layers (e.g., by brazing or welding), a step of chemically bonding two or more metal layers, a step of mechanically fastening two or more metal layers, or any combination thereof. Preferably the process includes a step of welding (e.g., laser welding or spot welding) the first and second components in the common region so that they are attached. The attached components preferably is in the form of a sheet and the common region preferably has a thickness that is equal to or less than the thickness of the first composite material. For example, such a sheet may have a generally uniform thickness. The process may include a step of forming (e.g., stamping) the sheet wherein one, two or all of the following regions is drawn (e.g., deep drawn): the first component region, the second component region, or the third component region.

The two components may be prepared in a single process. For example the process may include a step of interposing a core layer between a first metal layer and a second metal layer and simultaneously interposing a third (and optionally a fourth) metal layer between the first and second metal layers. Here, the core layer and the third metal layers preferably do not overlap one another. However the core layer and the third metal layer may abut each other. The third metal layer (and the optional fourth metal layer) preferably only are inserted into an edge region of the first and second metal layers. Such a process may be a continuous process that includes unwinding rolls of the first metal layer, the second metal layer, and the third metal layer. The core layer may be prepared in advance or may be extruded, calendered, or otherwise formed (e.g., into a polymeric sheet) during the process. The process may also include a step of depositing a second core layer between the third and fourth metal layers. The attachment of layers in the common region may also be performed in the same operation. For example, in a continuous process, one or more columns of welds (e.g., laser welds and/or spot welds) may be applied to the first, second, and third metal layers in the region where the third metal layer is interposed between the first and second metal layers.

If the first component is provided as a separate component from the second component, any core free region in the composite materials may be prepared by temporarily filling the region with a spacer material that is later removed. Such a spacer may be removed continuously (e.g., during the manufacture of the first composite material) or may be removed prior to the step of attaching the first component and the second component. The spacer may be configured so that the core free region is an insert receiving feature, such as described herein. For example, the spacer may have a generally wedge shape. The process may include a step of forming an inserting feature or a receiving feature onto a core free region of the first component or the second component. For example, two metal sheets from the same component may be forced into contact in a generally core free region. Instead of directly forming a composite material with a core free region, the core free region may be formed by remove the core material from an edge region. Such a core removal process may employ heat, a mechanical tool, or both.

It will be appreciated that the first component, the second component, or the combined sheet including the first and second components may be cut into a shape (e.g., a blank) suitable for a particular article. For example, the components individually or together may be cut into a blank suitable for inserting into a stamping machine for forming a stamped article.

Figure 1:
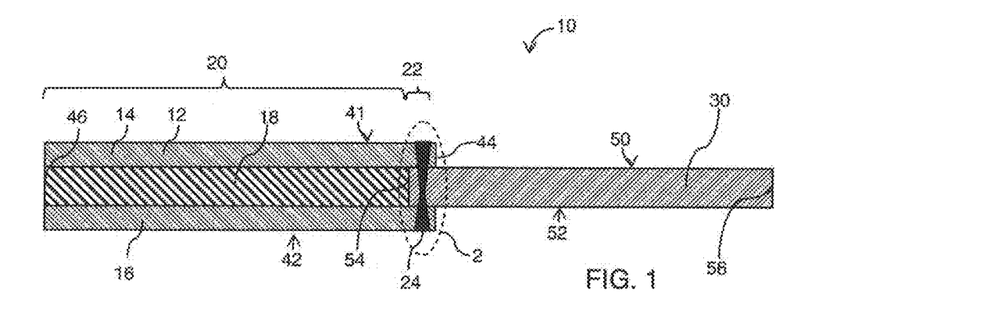
FIG. 1 is a cross-sectional view of an illustrative article including a sheet of a composite material attached to a second sheet that includes at least one metal layer.

FIG. 1 is a cross-sectional view of an article 10 including a sheet of a first composite material 12. The first composite material 12 is a sandwich composite including a core layer 18 interposed between two metal layers 14, 16. The core layer preferably is a polymeric material, such as a filled polymeric material that includes one or more fillers distributed in a polymer matrix. The first composite material 12 is attached to a second material 30 that includes one or more metal layers. As illustrated in FIG. 1, the second material may consist essentially of a monolithic metal sheet. The two sheets preferably are attached edgewise. Such an attachment may result in an article having an increased length, an increased width, or both. The first composite material includes one or more core layer free regions 22 that is generally free of the core layer and one or more core layer containing regions 20 that includes the core layer 18. In the core layer containing region 20, the core layer 18 may span the distance between the two metal layers 14, 16. The first composite material 12 may have a top surface 41 and an opposing bottom surface 42. The first composite material may have one or more edges, 44, 46. Preferably, at least one of the edges 44 is a core free region 22. The second material 30 has a top surface 50 and an opposing bottom surface 52. The second material generally has one or more edge surfaces 54, 56. As illustrated in FIG. 1, an edge of the second material may be located in a core free region 22 of the first composite material 12. As such, the article 10 may include a common region 2 which includes an edge of the two materials. The common region 2 includes one or more portions of the metal layers 14, 16 of the first composite material and one or more portions of the metal layer 30 of the second material. In the common region 2, the two materials are attached. For example, the metal layers 14, 16, 30 may be attached using one or more welds 24. In FIG. 1, the ratio of the thickness of the core layer 18 to the thickness of the second material 30 preferably is from about 0.3 to about 3, more preferably from about 0.6 to about 2, and most preferably from about 1 to about 1.5.

Figure 2:
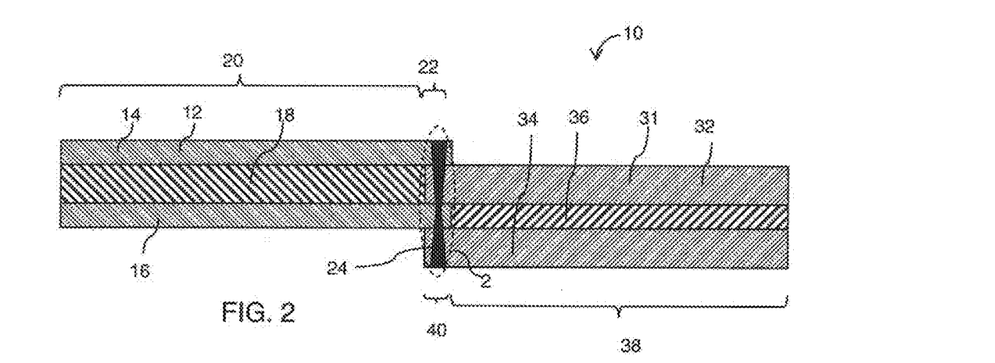
FIG. 2 is a cross-sectional view of an article including a sheet of a composite material attached to a second composite material illustrating features that may be employed in an article according to the teachings herein.
Figure 3:
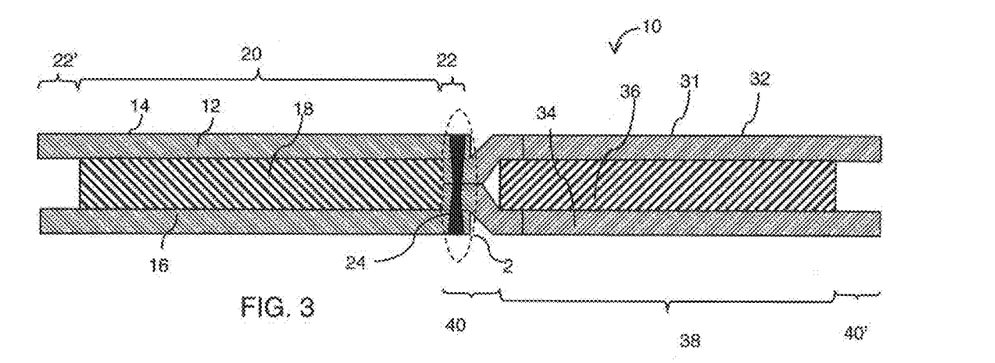
FIG. 3 is a cross-sectional view of an article including a sheet of a composite material attached to a second composite material illustrating features that may be employed in an article according to the teachings herein.
Figure 4:
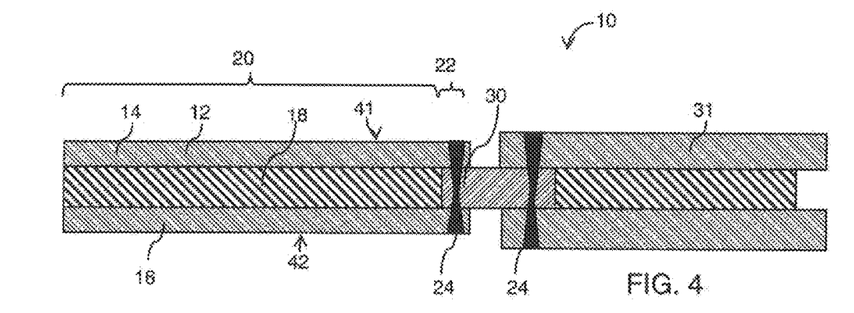
FIG. 4 is a cross-sectional view of an illustrative article including two sheets of a composite material which are both attached to a metal layer illustrating.

The article may include two or more composite materials, such as illustrated in FIGS. 2, 3, and 4. For example, the article 10 may include a first composite material 12 and a second composite article. The second composite material 31 may be the same or different form the first composite material 12. The second composite material may include a core layer 36 sandwiched between two metal layers 32, 34. The second composite material 31 may include a core free region 40 that is generally free of the core material, and a core containing region 38. A core free region 40 preferably is near one or more edges of the second composite material. The common region 2 may include one or more portions of the metal layers 14, 16 of the first composite material 12 and one or more portions of the metal layers 32, 34 of the second composite material 31. The common region 2 preferably is free of the core layers 18, 36. The two sheets may be attached in the common region 2, such as by one or more welds 24. The two composite materials may be vertically offset, such as illustrated in FIG. 2, or may be vertically aligned, such as illustrated in FIG. 3. One of the metal layers 32 of the second composite material 31 may be positioned between the two metal layers 14, 16 of the first composite material 12 and one of the metal layers 16 of the first composite material 12 may be positioned between the two metal layers 32, 34 of the second composite material, such as illustrated in FIG. 2. In a structure with one metal layer of a second composite material positioned between two metal layers of a first composite material (such as illustrated in FIG. 2), the ratio of the thickness of the core layer 18 to the thickness of the metal layer 32 that abuts the core layer 18 preferably is from about 0.3 to about 3, more preferably from about 0.6 to about 2, and most preferably from about 1 to about 1.5. Similarly, the ratio of the thickness of the core layer 36 to the thickness of the metal layer 16 that abuts the core layer 36 preferably is from about 0.3 to about 3, more preferably from about 0.6 to about 2, and most preferably from about 1 to about 1.5. One or both of the composite materials may be characterized as having a single edge that is a core free region 22, 40. One or both of the composite materials 30, 31 may be characterized as having two or more edges that are core free regions 22, 40, such as illustrated in FIG. 3.

A plurality of metal layers may be positioned in the core free region of a composite material. For example, a first composite material and a second composite material may both have core free regions. The second composite material may have the metal layers 32, 34 compressed together in a core free region 40 so that the metal layers can fit into the core free region of the first composite material. In a structure with two metal layer of a second composite material positioned between two metal layers of a first composite material (such as illustrated in FIG. 3), the ratio of the thickness of the core layer 18 to the total thickness of the two metal layer 32, 34 that abuts the core layer 18 preferably is from about 0.3 to about 3, more preferably from about 0.6 to about 2, and most preferably from about 1 to about 1.5.

It may be particularly desirable for the article to have a generally uniform thickness. As such, preferably the first composite material and the second composite material have the same thickness. Additionally, the common region preferably has a thickness that is equal to or less than the thickness of the first composite material. For example, the one or more metal layers being inserted between the two metal layers of the first composite material preferably have a total thickness that is about equal to or less than the thickness of the core layer of the first composite material. Similarly, all of the metal layers in the common region 2 preferably have a total thickness less than the thickness of the first composite material, less than the thickness of the second composite material, or both. When the composite material is attached to the second material (e.g. the second composite material), the two materials in the composite are preferably coplanar. As such, they may be formed (e.g., stamped) or otherwise processed as a single sheet without having to worry about any bumps or discontinuity in the thickness. As illustrated in FIG. 3, the article may be characterized by: the first composite material 12 having the same thickness as the second composite material 31, the second composite material 31 being coplanar with the first composite material 12, and the second common region 2 having a maximum thickness that is about equal to or less than the thickness of the first composite material 12.

The article may include two composite materials that are attached to opposing edges of a second material 30 that includes or consists essentially of metal layer, such as illustrated in FIG. 4. For example, a metal sheet 30 may be welded 24 or otherwise attached to a first composite material 12 along one edge and may be welded 24 or otherwided attached to a second composite material 31 along a second edge.

Figure 5:
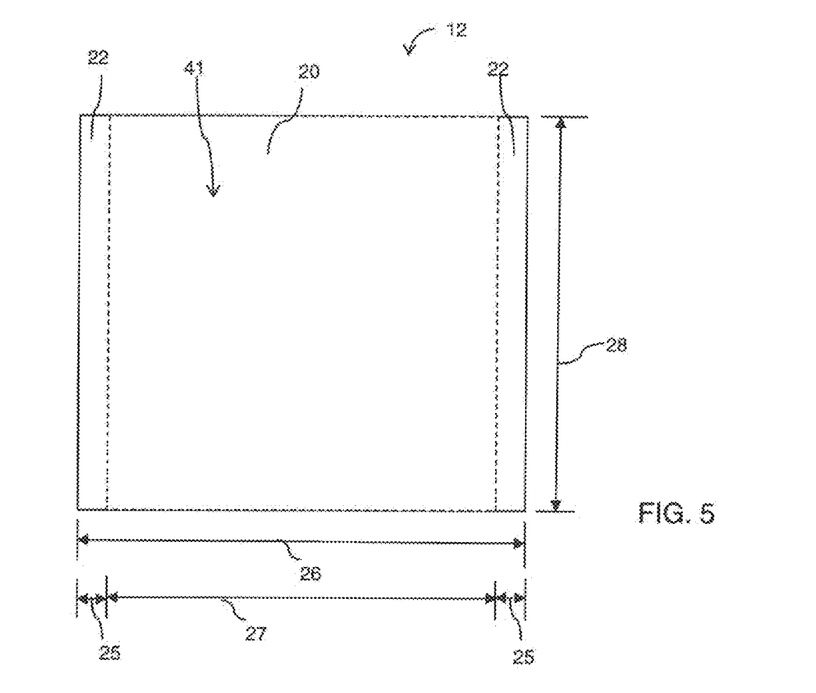
FIG. 5 is a top view of an illustrative composite material having regions that include a core layer and regions that are free of a core layer.

The composite material may be characterized as having a length 28 and a width 26, such as illustrated in FIG. 5. FIG. 5 is a top view of an illustrative composite material having one or more core free regions 22. For example, a core free region 22 may run lengthwise along one or both lengthwise edges of the composite material 12. The core free region 22 may be characterized as having a width 25, as having a length 28, or both. The core containing region 20 be characterized as having a width 27, as having a length 28, or both.

Figure 6:
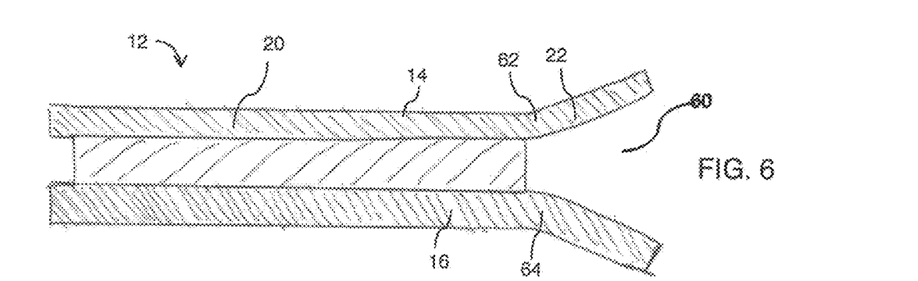
FIG. 6 is a cross-sectional view of an illustrative composite material having an edge (e.g., a receiving edge) configured to facilitate receiving one or more metal layers.

A composite material may include a core free region 22 that includes one or more receiving features 60, such as a receiving edge (see for example FIG. 6). The receiving feature may be a feature that facilitates in the inserting and/or alignment of a second material into the core free region. The receiving feature 60 may include an upward bend of the top metal layer 14, a downward bend of the bottom metal layer 16, or both, so that a larger opening is presented for inserting another material. As such, the spacing between the metal layers at the receiving edge of the core free region 22 may be greater than the spacing between the metal layers in the core containing region 20.

Figure 7:
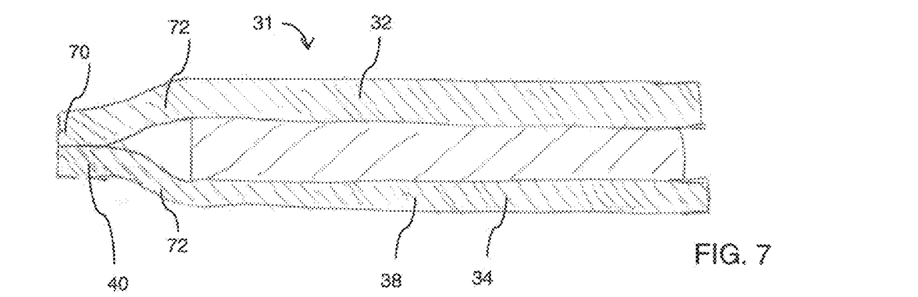
FIG. 7 is a cross sectional view of an illustrative composite material having an inserting edge (e.g. an inserting edge) configured for inserting into the edge of a second composite material.

A composite material may include a core free region 22 that includes one or more inserting features 70, such as a inserting edge, such as illustrated in FIG. 7. The inserting feature 70 may be a feature that reduces the profile of an edge so that it may more easily be inserted into the core free region of a composite material. The inserting feature 70 may include a downward bend 72 of the top metal layer 32, a upward bend of the bottom metal layer 34, or both, so that a thinner profile is present for inserting the core free region of another material. As such, the spacing between the metal layers at the inserting edge 40 may be less than the spacing between the metal layers in the core containing region 38.

It will be appreciated that a sheet of a composite material may include one or more receiving features, one or more inserting features, or both. For example, a composite material may have one edge that includes a receiving feature and a second edge that includes an inserting feature.

Figure 8:
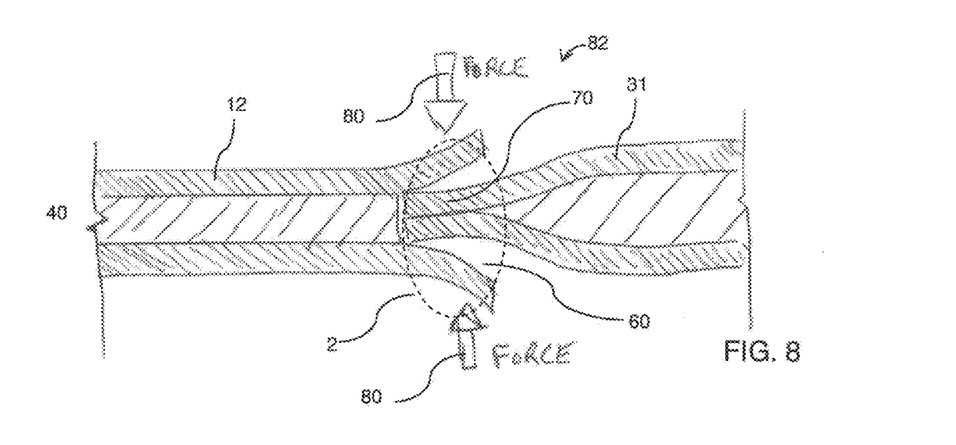
FIG. 8 is a cross-sectional view of showing an illustrative receiving edge of a first composite material receiving an inserting edge of a second composite material.

FIG. 8 illustrates is a cross-sectional view of two composite materials 12, 31 in the process of being attached 82. The first composite material 12 may receive one or more layers of the second composite material 31. Preferably the first composite material includes a receiving feature 60 and the second composite material includes an inserting feature 70 so that an edge of the second composite material that is free of the core layer can be inserted into an edge of the first composite material that is also free of core layer. After inserting the second composite material 31 into the receiving feature 60 of the first composite material 12, a force 80, such as a compressive force, may be applied in the common region 2. A force 80 may be employed to reduce or eliminate a receiving feature 60. A force 80 may be employed to mechanically fasten the first and second composite materials 12, 31 in the common region 2. A force may be applied for welding the first and second composite materials 12, 31 in the common region 2.

Figure 9:
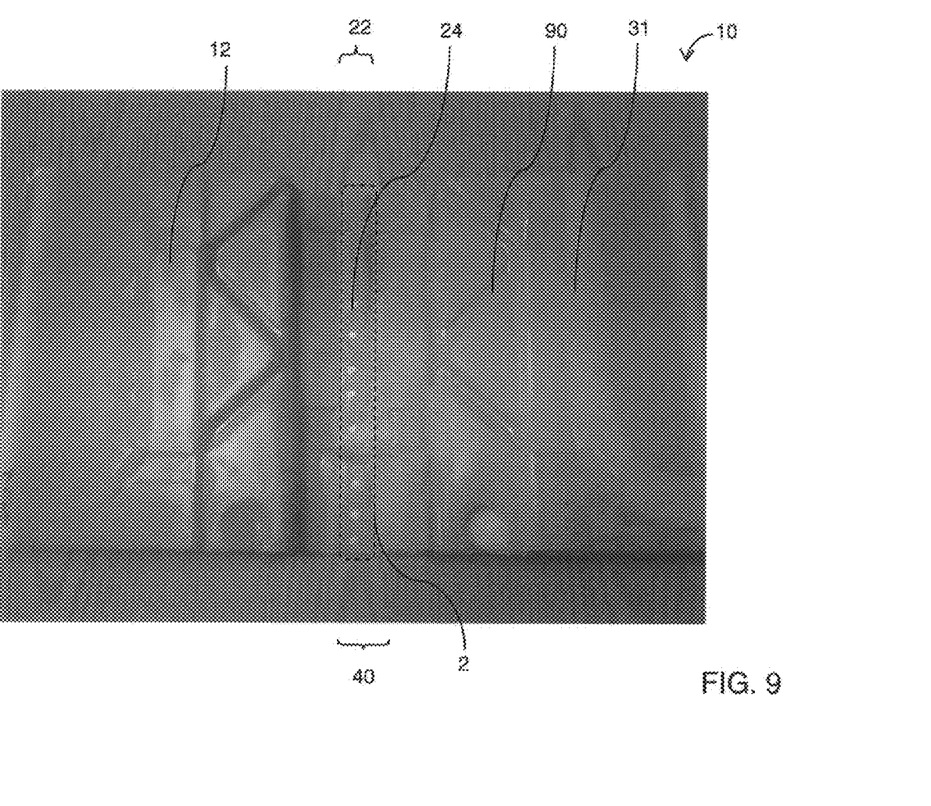
FIG. 9 is a top view of an article including two composite sheets with the edge of one sheet inserted between the metal layers of the edge of the second sheet, the sheets welded together along the common edge, and the article stamped.

FIG. 9 is a photograph of an article including a first composite material having a sandwich structure and a second composite material having a sandwich structure. Each metal layers have a thickness of about 0.2 mm and each core layer has a thickness of about 0.5 mm. Each composite material has an edge that is free of the core layer. The edges of the two metal layers of the second composite material are inserted into the metal core free region 22 of the first composite material. The two materials are welded together along at least a portion of their common region 2. The article is then deformed (e.g., stamped) so that one or more formed features 90 (e.g., a structural feature) is provided to the article.

Figure 10:
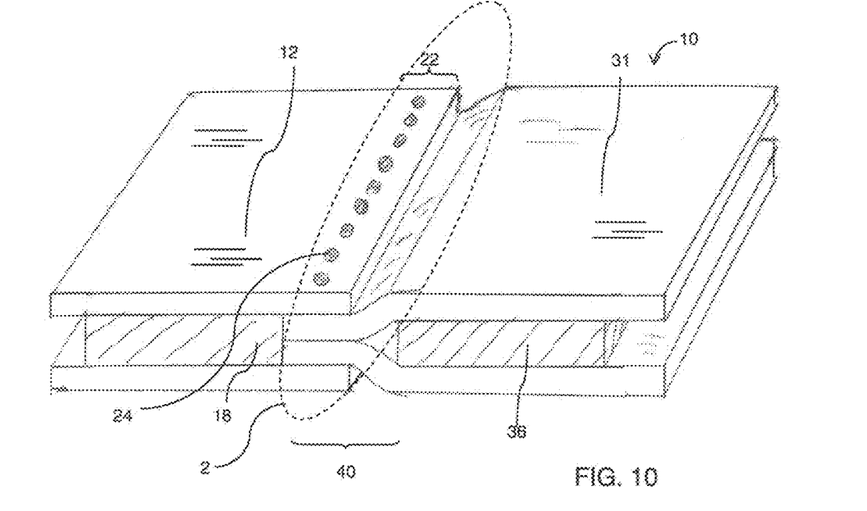
FIG. 10 is an illustrative perspective view of an article including two sheets of composite material that have been welded together along their common edge.

FIG. 10 is a perspective drawing showing features of an article including two composite materials 12, 31, that are attached along a common edge 2.

Figure 11:
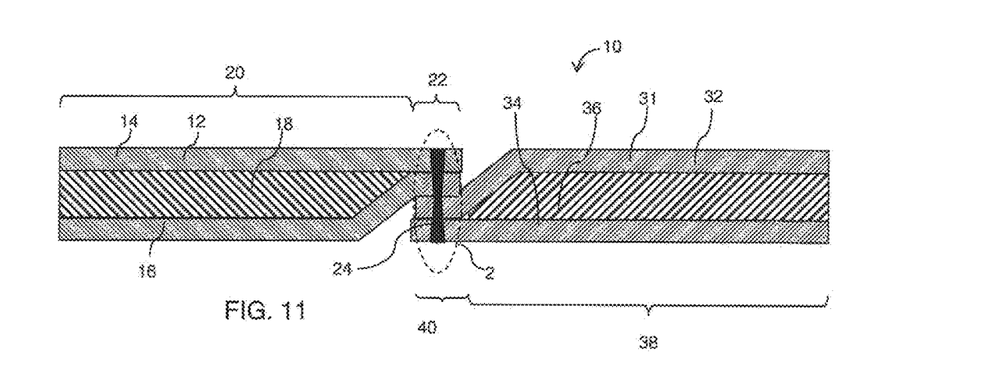
FIG. 11 is a cross-sectional view of an illustrative article that includes two sheets of composite materials that have been attached to form a sheet material that may be generally planar, that may have a generally uniform thickness, or both.

FIG. 11 is a cross-sectional view of an article including two sheets of a composite material. In the common region 2, the two metal layers of the first composite material may be arranged on the same side (e.g., both above or both below) the two metal layers of the second composite material. One metal layer 16 of the first composite material 12 may contact one of the metal layers 32 of the second composite material 31. These two metal layers 16 and 32 are preferably bent so that the thickness of the composite materials is reduced as the edge that is core free regions 22, 40 are approached. In the common region 2, the thickness may be defined by the total thickness of the four metal layers 14, 16, 32, 34. Preferably the total thickness in the common region 2 is about the same as or less than the thickness of the first composite material. The first composite material and the second composite material preferably have the same thickness and are coplanar so that the composite article can be formed or otherwise processed as a single sheet may be processed.

Figure 12:
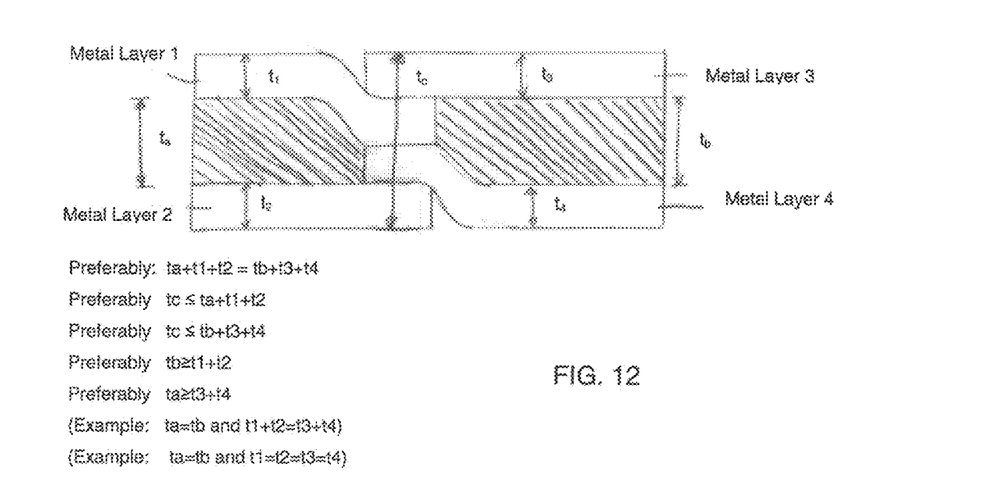
FIG. 12 is a cross-section of an illustrative article that includes two sheets of composite material that have been attached to form a sheet material that may be generally planar, that may have a generally uniform thickness, or both.
Figure 13:
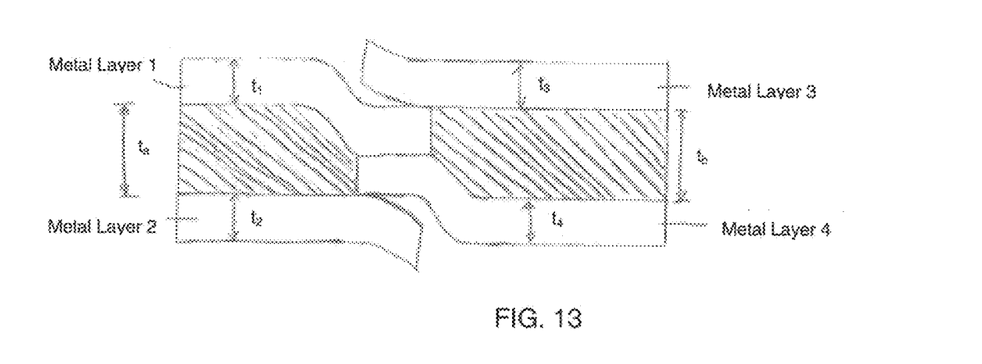
FIG. 13 is a cross-section of an illustrative first and second composite materials that include an insert receiving feature, such as for preparing an article as illustrated in FIG. 12.

As illustrated in FIG. 12, an article having two composite materials that are interdigitated in the common region may have composite materials that are generally planar and have a generally uniform thickness. FIG. 13 illustrates two composite materials that may be employed to prepare the article illustrated in FIG. 12. For example, the first composite material may have a receiving feature, the second composite material may have a receiving feature, or both. As illustrated in FIG. 13, one or both composite materials may have one region where the first metal layer bends toward the second metal layer in one region, and an adjacent region where the second metal layer bends away from the first metal layer. After the article is formed, preferably one or both composite materials are characterized as having a first metal layer that bends towards the second metal layer (e.g., in a region adjacent to a common region), and a second metal layer that is generally planar, such as illustrated in FIG. 12.

The articles and composite materials of the present invention may be used in automotive and other transportation related applications, building construction related applications, and appliance related applications. The articles and composite materials may be used in applications such as an automotive panel, a truck panel, a bus panel, a container (e.g., a container used for shipping), a panel on a train car, a panel on a jet, a tube (e.g., a bicycle tube), a motorcycle panel (e.g., a cowling or fairing), a trailer panel, a panel on a recreational vehicle, a panel on a snowmobile, an automotive bumper fascia, a spoiler, a wheel well liner, a floor pan (e.g., an automotive floor pan), an aerodynamic ground effect, an air dam, a container, a bed liner, a divider wall, an appliance housing, a vehicle fuel filler door, a vehicle bumper, a decorative insert, a duct, a grab bar, a storage compartment door, a garage door panel, a hurricane shutter, a housing for an electronic device (such as a cellular phone, a computer, a camera, a tablet computer, a music or video storage device, or a music or video player), a console, an air inlet part, a battery housing, a grille, a wheel well, or a seat pan. The articles and composite materials may be used as a building construction material, such as an exterior trim element, flashing, gutters, shingles, walls, flooring, countertops, cabinet facing, window frames, door frames, paneling, vents, ducts, planking, framing studies, shelving, plumbing fixtures, sinks, shower pans, tubs, and enclosures. Automobile panels which may use the articles and composite materials described herein include front quarter panels, rear quarter panels, door panels, hood panels, roof panels, floor pans, or otherwise. An exemplary application is an automotive floor pan.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist or even consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

As used herein the terms "polymer" and "polymerization" are generic, and can include either or both of the more specific cases of "homo-" and copolymer" and "homo- and copolymerization", respectively.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. An article comprising:
   a. a first sheet, wherein the first sheet is a composite sheet including a polymeric core layer interposed between a first metal layer and a second metal layer, wherein the composite sheet includes one or more peripheral regions without a polymeric core layer between the first and second metal layers, and the first sheet including the polymeric core layer, the first metal layer, and the second metal layer has a first thickness; and
   b. a second sheet including at least one metal layer;
   wherein the article includes a common region where the composite sheet and the second sheet are welded together, the common region including one of the peripheral regions of the composite sheet,
   at least one metal layer of the second sheet is interposed between the first and second metal layers of the composite sheet in the common region, wherein the common region consists of portions of the metal layers of the first and second sheets, and the common region has a thickness that is less than the first thickness.

2. The article of claim 1, wherein the second sheet is a metal sheet that is free of a polymeric core layer.

3. The article of claim 1 wherein the second sheet is a composite sheet including a polymeric core layer interposed between two metal layers and having one or more peripheral regions without the core layer between the first and second metal layers.

4. The article of claim 3, wherein the two metal layers of the second sheet are interposed between the two metal layers of the first sheet in the common region.

5. The article of claim 3 wherein one of the two metal layers of the second sheet are interposed between the two metal layers of the first sheet; and one of the two metal layers of the first sheet are interposed between the two metal layers of the second sheet.

6. The article of claim 1, wherein the polymeric core layer includes metallic fibers having a length of about 30 mm or less, wherein the volume of the metal fibers is from about 3 volume percent to about 23 volume percent, based on the total volume of the polymeric core layer; and the polymeric core layer includes about 5 volume percent or less void, based on the total volume of the polymeric core layer.

7. The article of claim 1, wherein the first composite material includes a core layer that includes a sufficient amount of metal fibers so that a weld current can pass through the core for welding to a metal substrate, and the second composite material includes a core layer that is generally free of metal fibers.

8. The article of claim 1, wherein
   the first and second sheet are joined in a joining direction along a dimension of the article, wherein the dimension is a length or a width of the article, and
   the article includes a plurality of spaced apart welds extending at least 50 percent of the dimension of the article in the joining direction.

9. The article of claim 1, wherein
   the polymeric core layer includes from about 75 to about 95 volume percent polyethylene, from about 5 to 25 volume percent metal fibers, and
   from about 0 to 5 volume percent voids;
   wherein the metal fibers have an average length from about 3 to 30 mm.

10. A process of manufacturing an article of claim 1, comprising the steps of:
   a. providing a first composite sheet including a polymeric core layer interposed between a first metal layer and a second metal layer, wherein the first composite sheet includes one or more peripheral regions without a polymeric core layer between the first and second metal layers;
   b. providing a second sheet comprising at least a third metal layer, wherein the third metal layer has an edge, and the thickness of the third metal layer is sufficiently low so that the edge of the third metal layer can fit between the first and second metal layers in one of the peripheral regions of the first composite sheet;

c. positioning the edge of the third metal layer between the first metal layer and the second metal layer of the first composite sheet so that a weld stack including a portion of each of the first metal layer, the second metal layer, and the third metal layer is formed, the weld stack having a width of about 5 mm or more;

d. welding the weld stack.

11. The process of claim 10, wherein
the second sheet is a second composite sheet including a third metal layer and a fourth metal layer; the weld stack includes a portion of the fourth metal layer; and
the welding includes welding the first, second, third, and fourth metal layers.

12. The process of claim 11, wherein the weld stack includes either:
a) both the third and fourth metal layers interposed between the first and second metal layers; or
b) the second metal layer interposed between the third and fourth metal layers.

13. The process of claim 10, wherein the process includes a step of stamping, bending, or otherwise forming an article including the first sheet and the second sheet, wherein the first sheet and the second sheet are both plastically deformed.

14. A process for manufacturing an article of claim 1, comprising a step of welding the composite sheet to the second sheet.

15. The article of claim 1, wherein the second sheet is a second composite sheet includes a third metal layer and a fourth metal layer, wherein in the common region, the third metal layer is welded directly to the fourth metal layer.

16. The article of claim 1, wherein the second sheet is a second composite sheet includes a third metal layer and a fourth metal layer, wherein in the common region, the third metal layer is interposed between the first and second metal layers and the second metal layer is interposed between the third and fourth metal layers.

17. An article comprising:
a. a first composite sheet including a polymeric core layer interposed between a first metal layer and a second metal layer, wherein the first composite sheet includes one or more peripheral regions including a first peripheral region without a polymeric core layer between the first and second metal layers; and
b. a second composite sheet including a polymeric core layer interposed between a third metal layer and a fourth metal layer, wherein the second composite sheet includes one or more peripheral regions including a first peripheral region without a polymeric core layer between the third and fourth metal layers; and
wherein
the first, second, third, and fourth metal layers have a thickness of about 0.08 mm or more;
the polymeric core layer of the first composite sheet has a thickness that is greater than the thickness of the third metal layer;
the first composite sheet and the second sheet are welded together in a common region, the common region including the first peripheral region of the first composite sheet and the first peripheral region of the second composite sheet, the common region including one or more welds joining the first and second composite sheets, and
at least the third metal layer is interposed between the first and second metal layers in the common region;
wherein the common region has a thickness less than a thickness of the first composite sheet.

18. The article of claim 17, wherein
the first, second, third, and fourth metal layers have a thickness of about 0.10 mm or more;
the first polymeric core layer has a thickness greater than the combined thickness of the third and fourth metal layer;
in the common region, the fourth metal layers are interposed between the first and second metal layers;
and the first peripheral region of the first composite sheet extends inwards about 5 mm or more from the edge.

19. The article of claim 17, wherein
the first composite sheet has a thickness, a length, and a width; and
the first composite sheet includes a second peripheral region without a polymeric core layer between the first and second metal layers, wherein the first and second peripheral regions of the first composite sheet are on opposing edges of the first composite sheet, wherein the first and second peripheral regions of the first composite sheet lengthwise extend the length of the first composite sheet, and widthwise extend inwards about 10 mm or more from the edge.

20. An article comprising:
i) a first composite material that is a sandwich composite including a first core layer interposed between a first metal layer and a second metal layer, wherein the first composite material has a generally uniform thickness; and
ii) a second composite material that is a sandwich composite including a second core layer interposed between a third metal layer and a fourth metal layer, wherein the second composite material has a generally uniform thickness that is about the same as the thickness of the first composite material, and the second composite material is generally coplanar with the first composite material;
wherein the article includes a common region that includes a portion of the first metal layer, a portion of the second metal layer, a portion of the third metal layer and a portion of the fourth metal layer; wherein the common region has a total thickness that is less than the thickness of the first composite material, and wherein the common region is a region without the first core layer and without the second core layer, and wherein at least the portion of the third metal layer is interposed between the portion of the first metal layer and the portion of the second metal layer.

* * * * *